No. 681,977. Patented Sept. 3, 1901.
J. M. RICARD & F. C. GARY.
SPARKING PLUG.
(Application filed Mar. 15, 1901.)

(No Model.)

Witnesses:
J. D'Arcy McMahon.
G. S. Noble

Inventors.
Jean-Marie Ricard
François Clément Gary
by B. Singer. Att'y.

United States Patent Office.

JEAN MARIE RICARD AND FRANÇOIS CLÉMENT GARY, OF TOULOUSE, FRANCE.

SPARKING PLUG.

SPECIFICATION forming part of Letters Patent No. 681,977, dated September 3, 1901.

Application filed March 15, 1901. Serial No. 51,223. (No model.)

*To all whom it may concern:*

Be it known that we, JEAN MARIE RICARD and FRANÇOIS CLÉMENT GARY, engineers, of 19 Rue du Taur, Toulouse, in the Republic of France, have invented Improvements in Sparking Plugs, of which the following is a specification.

This invention relates to sparking plugs, and in order that our invention may be readily understood and carried into effect we will describe the same fully with reference to the accompanying drawings, in which—

Figure 1:
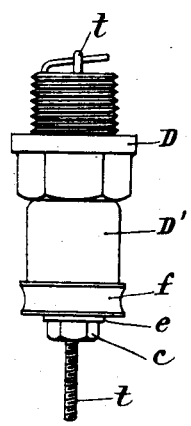
Figure 2:
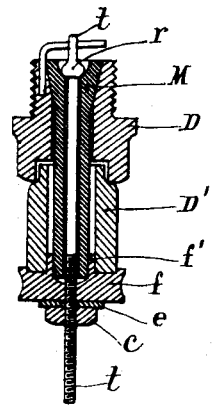

Figure 1 is an external view of a sparking plug embodying our invention, and Fig. 2 is a longitudinal section of the same.

As shown, our improved sparking plug is provided with a centrally-disposed rod $t$, which is formed with a screw-threaded portion at one end and with a collar or shoulder $r$ at the other end. The said rod $t$ is engaged in the cylindro-conical sleeve M, made of porcelain or other suitable material. The conical portion of the sleeve M fits exactly into a tapered seat within the metal socket D and flush with the screw end thereof. We also provide a porcelain ring D', having a reduced end in engagement with the socket D and surrounding the free end of the sleeve M. The rod $t$, sleeve M, and ring D' are maintained in a concentrical position by means of a centering-washer $f$, of suitable material, which is formed with a flange $f'$, engaging between the ring D' and the sleeve M. The hole or opening for the rod $t$ being perfectly central in the washer $f$ prevents the rod from accidentally coming into contact with the sides of the sleeve. After the washer $f$ has been properly inserted the rod $t$ receives a washer $e$ and a screw-nut $c$, which by reason of the collar or shoulder $r$ forces the conical portion of the sleeve into the conical seat of the socket and locks the parts $f'$, D', and D firmly together.

Having now particularly described and ascertained the nature of our said invention and in what manner the same is to be performed, we declare that what we claim is—

A sparking plug comprising a socket, having a conical seat formed within its bore, a non-conducting ring, one end of which telescopes with the adjacent end of the socket, a sleeve having one end fitted to the conical seat in the bore of the socket, a rod extending through the sleeve, said rod having a collar or shoulder on one end and a centering-washer embracing adjacent ends of the ring, sleeve and rod whereby to hold them concentric and out of contact with one another, and means on the rod by which parts of the plug are held together.

In testimony that we claim the foregoing we have hereunto set our hands.

JEAN MARIE RICARD.
FRANÇOIS CLÉMENT GARY.

Witnesses:
JOSEPH MATRAY,
EDMOND LECOUTWEIER.